United States Patent
Yu et al.

(10) Patent No.: US 10,002,424 B2
(45) Date of Patent: Jun. 19, 2018

(54) IMAGE PROCESSING SYSTEM AND METHOD TO RECONSTRUCT A THREE-DIMENSIONAL (3D) ANATOMICAL SURFACE

(71) Applicant: SONY CORPORATION, Tokyo (JP)

(72) Inventors: Liangyin Yu, Fremont, CA (US); Ming-Chang Liu, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 15/273,287

(22) Filed: Sep. 22, 2016

(65) Prior Publication Data

US 2018/0082421 A1  Mar. 22, 2018

(51) Int. Cl.
| | | |
|---|---|---|
| G06K 9/00 | (2006.01) | |
| G06T 7/00 | (2017.01) | |
| G06T 19/20 | (2011.01) | |
| G06T 5/00 | (2006.01) | |
| G06T 19/00 | (2011.01) | |

(52) U.S. Cl.
CPC .......... *G06T 7/0012* (2013.01); *G06T 5/002* (2013.01); *G06T 7/0081* (2013.01); *G06T 19/003* (2013.01); *G06T 19/20* (2013.01); *G06T 2207/10021* (2013.01); *G06T 2207/20021* (2013.01); *G06T 2207/20104* (2013.01); *G06T 2207/20228* (2013.01); *G06T 2207/30004* (2013.01); *G06T 2210/41* (2013.01)

(58) Field of Classification Search
CPC combination set(s) only.
See application file for complete search history.

(56) References Cited

U.S. PATENT DOCUMENTS

| | | | |
|---|---|---|---|
| 6,591,004 B1 | 7/2003 | VanEssen et al. | |
| 2008/0273777 A1 | 11/2008 | Luboz et al. | |
| 2010/0166323 A1* | 7/2010 | Zhao | G06K 9/6211 |
| | | | 382/218 |
| 2013/0222550 A1* | 8/2013 | Choi | H04N 13/025 |
| | | | 348/47 |

OTHER PUBLICATIONS

Oliver Fleig et al., "Surface reconstruction of the surgical field from stereoscopic microscope views in neurosurgery", HAL Id: hal-00816696, Apr. 22, 2013, pp. 7.

(Continued)

*Primary Examiner* — Alex Liew
(74) *Attorney, Agent, or Firm* — Chip Law Group

(57) ABSTRACT

Various aspects of an image-processing system and method to reconstruct a three-dimensional (3D) anatomical surface of an anatomical portion are disclosed herein. The system includes an image-processing device configured to receive a plurality of stereo images of the anatomical portion. A first set of key points with a point density greater than a threshold value is identified. A second set of key points is determined based on filtration of one or more outlier key points from the identified first set of key points. A 3D anatomical surface of the anatomical portion is reconstructed based on disparity of one or more matched key points in the determined second set of key points and a smoothing operation performed on the disparity.

21 Claims, 7 Drawing Sheets

(56) References Cited

OTHER PUBLICATIONS

Perrine Paul et al., "A surface registration approach for video-based analysis of intraoperative brain surface deformations", Workshop on Augmented Environments for Medical Imaging and Computer-Aided Surgery (AMI-ARC'06), 2006, pp. 9.

Maxus Axer et al. "High-resolution fiber tract reconstruction in the human brain by means of three-dimensional polarized light imaging", 3D-polarized light imaging, Dec. 30, 2011, Frontiers in Neuroinformatics, vol. 5—Article 34, pp. 13.

Johannes Totz et al., "Dense surface reconstruction for enhanced navigation in MIS.", Medical Image Computing and Computer-Assisted Intervention—MICCAI 2011, vol. 6891 of the series Lecture Notes in Computer Science, 2011, pp. 8.

Tao Tianyuan et al.,"Small celestial body image feature matching method based on PCA-SIFT", Control Conference (CCC), 2015 34th Chinese, Hangzhou, doi: 10.1109/ChiCC.2015.7260355, 2015, pp. 4629-4634.

* cited by examiner

IMAGE PROCESSING SYSTEM AND METHOD TO RECONSTRUCT A THREE-DIMENSIONAL (3D) ANATOMICAL SURFACE

CROSS-REFERENCE TO RELATED APPLICATIONS/INCORPORATION BY REFERENCE

None.

FIELD

Various embodiments of the disclosure relate to a system and method for medical image processing. More specifically, various embodiments of the disclosure relate to a system and method for image processing to reconstruct a three-dimensional (3D) anatomical surface.

BACKGROUND

Advancements in the field of medical imaging techniques and associated sensors and/or devices have provided an ability to visualize the interior of a body for clinical analysis and medical purposes. In certain scenarios, a surgeon may plan a surgery to access a region-of-interest of an anatomical portion of a subject before the surgery is actually performed. For example, a pre-operative scans or imaging, such as pre-operative magnetic resonance imaging (MRI), may be performed for such planning purpose. In an operating room scenario, current systems and technology that use intra-operative imaging of the anatomical portion to visualize the anatomical portion may be unsafe for the subject for various reasons. One such reason may be a risk of prolonged exposure of the anatomical portion during the surgery and extended time of surgical operation. Further, due to the complexity of the anatomical structures, and certain deformation of tissue after exposure of the tissue of the anatomical portion during the surgery, it may be difficult to evaluate the displacement of the anatomical structures during the surgery. During the surgery, such as an image-guided surgery, a surgeon may require to navigate through a visible surface of the anatomical portion of the subject, such as a patient, to reach the region-of-interest in the anatomical portion. There is a great need to navigate through the visible surface of the anatomical portion during the surgery in the reference frame of pre-operative MRI taken before the surgery. Thus, a reliable, a safe, and a real-time or near real-time 3D reconstruction of the visible anatomical surface (s) of the anatomical portion may be required, which may be a difficult task. Although 3D reconstruction from two dimensional (2D) stereo input images are known, the existing stereo images matching-based methods for 3D reconstruction do not work well for an anatomical surface, such as a brain tissue surface.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for image processing to reconstruct a three-dimensional (3D) anatomical surfaces provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
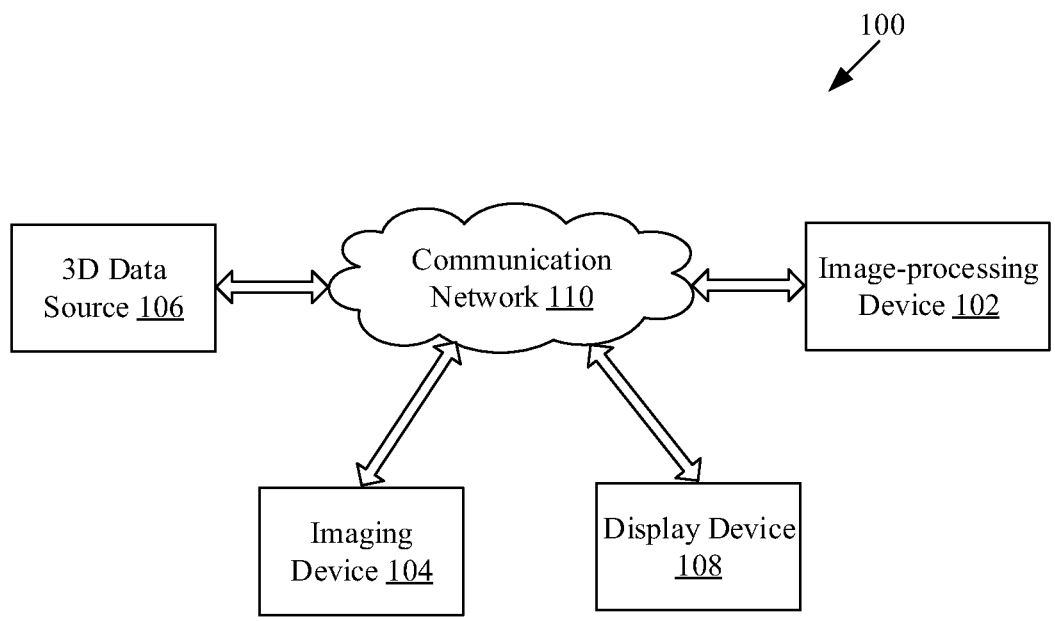
FIG. 1 is a block diagram that illustrates a network environment for image processing to reconstruct a 3D anatomical surface, in accordance with an embodiment of the disclosure.

Various implementations may be found in an image processing system and/or method to reconstruct a 3D anatomical surface. Exemplary aspects of the disclosure may include a method to receive, by an image-processing device, a plurality of stereo images of an anatomical portion from an imaging device. Based on matching of each key point of a left image with corresponding key point of a right image of the received plurality of stereo images of the anatomical portion, a first set of key points may be identified. The identified first set of key points may have a point density greater than a threshold value. A second set of key points may be determined based on filtration of one or more outlier key points from the identified first set of key points. The 3D anatomical surface reconstruction of the anatomical portion may be further based on a smoothing operation performed on the disparity of one or more matched key points in the determined second set of key points.

In accordance with an embodiment, the plurality of stereo images of the anatomical portion may be captured by the imaging device. The captured plurality of stereo images of the anatomical portion may be further transmitted to the image-processing device. The imaging device may correspond to at least a stereoscopic imager. In accordance with an embodiment, rectification of the received plurality of stereo images of the anatomical portion may be performed in an event that one or more parameter values of the imaging device are less than one or more corresponding specified threshold values.

In accordance with an embodiment, a plurality of regions may be generated based on segmentation of the received plurality of stereo images of the anatomical portion. In accordance with an embodiment, at least two of the generated plurality of regions may be combined based on a density of the identified first set of key points in at least two of the generated plurality of regions.

In accordance with an embodiment, the reconstruction of the 3D anatomical surface may be further based on interpolation of the disparity between each key point in the generated second set of key points based on one or more interpolation parameters. In accordance with an embodiment, the smoothing operation may be performed on the interpolated disparity computed from key points in the generated second set of key points based on a membrane energy value of each of the interpolated key points.

In accordance with an embodiment, the membrane energy value of each of the interpolated disparity computed from key points may be determined based on one or more energy function parameters. In accordance with an embodiment, the reconstructed 3D anatomical surface associated with an intra-operative state of the anatomical portion may be aligned with 3D data associated with a pre-operative state of the anatomical portion during a surgery. In accordance with an embodiment, rendering of the aligned reconstructed 3D anatomical surface on a display may be controlled to enable continuous navigation towards a region-of-interest in the anatomical portion during the surgery.

FIG. 1 is a block diagram that illustrates a network environment for image processing to reconstruct a 3D anatomical surface, in accordance with an embodiment of the disclosure. With reference to FIG. 1, there is shown a network environment 100. The network environment 100 may include an image-processing device 102, an imaging device 104, a 3D data source 106, a display device 108, and a communication network 110. The image-processing device 102 may be communicatively coupled to the imaging device 104, the 3D data source 106, and the display device 108, via the communication network 110.

The image-processing device 102 may comprise suitable logic, circuitry, interfaces, and/or code that may be configured to receive a plurality of stereo images of an anatomical portion of a subject from the imaging device 104. In accordance with an embodiment, the image-processing device 102 may be configured to reconstruct a 3D anatomical surface of the anatomical portion based on input from the imaging device 104, such as the received plurality of stereo images. The reconstructed 3D anatomical surface may be associated with an intra-operative state of the anatomical portion. The functionalities of the image-processing device 102 may be implemented in local devices (such as a medical diagnostic device or a high-speed computing device), or remote devices (such as an application server). Examples of the image-processing device 102 may include, but are not limited to, at least one of a wearable device, such as smart-glass or a head-mounted device, a computer-assisted surgery system, a computing device, a server, an augmented reality-based display device, a computer work-station, a mainframe machine, and/or other image-processing devices.

In accordance with an embodiment, the anatomical portion may be an anatomical region, and/or an organ of the subject, such as a human. The anatomical portion may include a plurality of heterogeneous anatomical surface structures. In accordance with an embodiment, the anatomical portion may be a brain (cranial region), or at least a portion of a brain of the human. In such an embodiment, the plurality of heterogeneous surface structures may be the cortex, arteries, and blood vessels of the brain.

A person with ordinary skill in the art will understand that the scope of the disclosure is not limited to implementation of the disclosed system and method to assist in a surgery of the anatomical portion of the human subject. In accordance with an embodiment, the disclosed system and method may be used to assist in a surgery of anatomical portions or anatomical regions of an animal subject. Further, the disclosed system and method may also be useful to provide assistance in a surgery of anatomical portions or regions other than the brain.

The imaging device 104 may comprise suitable logic, circuitry, interfaces, and/or code that may be configured to capture the plurality of stereo images of the anatomical portion. Further, the imaging device 104 may be configured to transmit the captured plurality of stereo images of the anatomical portion to the image-processing device 102, via the communication network 110. Examples of the imaging device 104 may include, but are not limited to a stereoscopic imager and a surgical camera. For example, the imaging device 104 may be mounted on (or integrated with) a surgical microscope used to perform microsurgery.

The 3D data source 106 may comprise suitable logic, circuitry, interfaces, and/or code that may be configured to generate 3D data associated with the pre-operative state of the anatomical portion. The 3D data source 106 may be further configured to transmit the generated 3D data to the image-processing device 102, via the communication network 110. The 3D data, associated with the pre-operative state of the anatomical portion, may correspond to a Magnetic Resonance Imaging (MRI), or a Computed Tomography (CT) or a Positron Emission Tomography (PET) image of the anatomical portion. The 3D data source 106 may correspond to a magnetic resonance imaging (MRI) scanner, a server storing the 3D data, or multimodal sources that may include the MRI scanner. Examples of the multimodal sources used to obtain the 3D data associated with the pre-operative state of the anatomical portion may include, but are not limited to, a X-ray computed tomography (CT) scanner, a magnetic resonance imaging (MRI) scanner, a magnetic resonance angiography (MRA) scanner, a fluid-attenuated inversion recovery (FLAIR) based scanner, and/or a positron emission tomography (PET) scanner.

The display device 108 may comprise suitable logic, circuitry, interfaces, and/or code that may be configured to render the reconstructed 3D anatomical surface of the anatomical portion. The display device 108 may be further configured to render an aligned view of the reconstructed 3D anatomical surface and the 3D data associated with the pre-operative state of the anatomical portion during the surgery. Examples of the display device 108 may include, but are not limited to, a display screen, a television (TV), a laptop, a tablet computer, a smartphone, a smart-glass display, and/or an optical head-mounted display device.

The communication network 110 may include a communication medium through which the image-processing device 102, the imaging device 104, the 3D data source 106, and the display device 108 may communicate with each other. Examples of the communication network 110 may include, but are not limited to, at least one of the Internet, a cloud network, a Long Term Evolution (LTE) network, a wireless personal area network (WPAN), a Wireless Local Area Network (WLAN), a Local Area Network (LAN), a wireless wide area network (WWAN), a telephone line (POTS), and/or a Metropolitan Area Network (MAN). Various devices in the network environment 100 may be operable to connect to the communication network 110, in accordance with various wired and wireless communication protocols. Examples of such wired and wireless communication protocols may include, but are not limited to, at least one of Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, Bluetooth (BT) communication protocols, and/or variants thereof.

In accordance with an embodiment, in the pre-operative state, i.e. prior to a surgery, the image-processing device 102 (or another computing device (not shown)) may be configured to acquire data associated with an anatomical portion of the subject from the 3D data source 106. The received data may include a plurality of 2D images that represents slice planes taken through a volume of the anatomical portion, such as slices through the skull of the human subject. The received data may correspond to MRI data or other multimodality data, such as the CT and the MRI, taken prior to a surgery. The image-processing device 102 may be configured to generate 3D data of the anatomical portion in the pre-operative state, based on a 2D-to-3D geometry processing. The 2D-to-3D geometry processing may be a mesh geometry processing or a grid geometry processing. The generated 3D data may correspond to a 3D structure (or 3D model in the pre-operative state). The display device 108 may be configured to display one or more views of the generated 3D data of the anatomical portion prior to the surgery. A surgeon may plan the surgery to be conducted for the anatomical portion, based on the displayed one or more views of the 3D structure of the anatomical portion. During the formulation of the surgical plan, physical models, such as organ models, vessel maps, nerve maps, muscle and tendon maps, tissue structures, or combinations thereof, can formulate a surgical strategy with optimum access paths, and safe regions that can accept intrusion by surgical tools during the surgical operation.

In operation, in the intra-operative state (when the surgery is performed), the imaging device 104 may capture a plurality of stereo images of the anatomical portion. In accordance with an embodiment, the image-processing device 102 may further be configured to receive the plurality of stereo images of the anatomical portion, from the imaging device 104. In accordance with an embodiment, the plurality of stereo images of the anatomical portion may be received via the communication network 110 in an event that the image-processing device 102 and the imaging device 104 are separate devices. Alternatively, in accordance with an embodiment, the imaging device 104 and the image-processing device 102 may be an integrated device. In such an embodiment, the receipt of the plurality of stereo images may be an internal communication. In accordance with an embodiment, the plurality of stereo images may correspond to a pair of video captured from a surgical-grade stereoscopic camera, such as the imaging device 104.

In accordance with an embodiment, the image-processing device 102 may be configured to rectify the received plurality of stereo images of the anatomical portion in an event that one or more parameter values of the imaging device are less than one or more corresponding specified threshold values. The one or more parameter values of the imaging device 104 may be intrinsic and/or extrinsic parameters. In certain scenarios, the imaging device 104 may not be calibrated either for intrinsic and/or extrinsic camera parameters. Consequently, the captured plurality of stereo images may not be calibrated i.e. a geometric distortion may exist between each pair of stereo images. In such scenarios, the rectification operation may be performed for the received plurality of stereo images to minimize geometric distortion and align the horizontal image scan lines. In certain other scenarios, the stereoscopic camera 302 may be pre-calibrated for intrinsic and/or extrinsic camera parameters. In such scenarios, the captured plurality of stereo images may not require rectification as geometric distortion may not exist, or may be within specified acceptable limit. In such a case, the rectification operation may not be required.

In accordance with an embodiment, the image-processing device 102 may be configured to identify a first set of key points with a point density greater than a threshold value. The first set of key points may be identified based on matching of each key point of a left image with corresponding key point of a right image of the received plurality of stereo images of the anatomical portion. The first set of key points may be automatically identified and generated on each stereo image pair, such as the left image and the right image, of the received plurality of stereo images of the anatomical portion in real-time or near real-time. The generated first set of key points may be dense providing a good coverage of the visible area, i.e. an anatomical surface area of the anatomical portion currently visualized though the imaging device 104. It is to be understood that the anatomical surfaces (such as a brain surface), of which the plurality of stereo images are captured, are different from other non-anatomical surfaces. For example, the anatomical surfaces are usually devoid of sharp edges and planar areas. Further, the anatomical surfaces may be smeared with fluids, which may reflect light when the plurality of stereo images are captured. Thus, it may be more difficult to establish a correspondence between each key point of the left image with a corresponding key point of the right image of the received plurality of stereo images in case of the anatomical portion as compared to non-anatomical surfaces. Further, operations may be required to obtain reliable 3D key points to enable generation of the 3D anatomical surface of the anatomical portion, as described below.

In accordance with an embodiment, the image-processing device 102 may further be configured to generate a plurality of regions based on segmentation of the received plurality of stereo images of the anatomical portion. The plurality of regions may correspond to different tissue structures of the anatomical surface area of the anatomical portion and surrounding regions, as visualized though the imaging device 104. The segmentation of the received plurality of stereo images of the anatomical portion may be performed based on a graph-based tissue segmentation technique, such as a graph partitioning method. The received plurality of stereo images may include certain regions that are on different height or plane at the time of capture of the plurality of stereo images during the surgery. For example, when a skull is opened during the surgery, brain tissue surface and the skull may lie at different height. Thus, a region that may correspond to the skull portion in the plurality of stereo images may not be necessary for 3D anatomical surface reconstruction purpose, and thus may be removed. Further, certain instruments may be used to hold an anatomical portion during the surgery. An example of such instruments is a retractor that is used to separate edges of a surgical incision to hold underlying organs and tissues, so that anatomical regions under the incision may be accessed. Some portions of such instruments or the edges may also be captured in the received plurality of stereo images by the imaging device 104 during surgery. These unwanted regions may not be further necessary for 3D anatomical surface reconstruction purpose, and thus may be removed. Additionally, dense key points may not be generated for such unwanted regions, as the focus of the imaging device 104 may be on certain anatomical surface area that is of importance to access the region-of-interest. Based on a density of the identified first set of key points in each region, it may be determined if that region should be included into a main region for anatomical surface reconstruction purpose. Thereafter, two or more of the generated plurality of regions may be combined based on the density of the identified first set of key points in the two or more of the generated plurality of regions. The two or more of the generated plurality of regions may be combined according to dense key point number to find a single region for quick reconstruction.

In accordance with an embodiment, the image-processing device 102 may further be configured to determine a second set of key points based on filtration of one or more outlier key points from the identified first set of key points. In another scenario, the image-processing device 102 may further be configured to determine the second set of key points based on filtration of one or more outlier key points from the combined plurality of regions.

In accordance with an embodiment, the image-processing device 102 may further be configured to compute disparity of the one or more matched key points in the determined second set of key points. In accordance with an embodiment, the image-processing device 102 may further be configured to interpolate the disparity corresponding to each key point in the generated second set of key points based on one or more interpolation parameters.

In accordance with an embodiment, the image-processing device 102 may further be configured to perform at least a smoothing operation on the interpolated disparity in the generated second set of key points. The smoothing operation may be performed based on a membrane energy value of each of the interpolated disparity in the generated second set of key points. The membrane energy value of each of the interpolated disparity in the generated second set of key points may be determined based on one or more disparity parameters. In accordance with an embodiment, the image-processing device 102 may further be configured to reconstruct the 3D anatomical surface of the anatomical portion. The 3D anatomical surface may be reconstructed on basis of the smoothing operation performed on the disparity computed from the generated second set of key points. The 3D anatomical surface reconstruction may be further based on the disparity of one or more matched key points in the determined second set of key points. The membrane energy value is used to estimate a local disparity distribution and its impact on the 3D geometry of the anatomical surface.

In accordance with an embodiment, the image-processing device 102 may further be configured to align the reconstructed 3D anatomical surface with the 3D data associated with the pre-operative state of the anatomical portion during the surgery. The 3D data may be aligned with the reconstructed 3D anatomical surface to enable continuous navigation towards a region-of-interest, such as a tumor region, in the anatomical portion during the surgery.

In accordance with an embodiment, the image-processing device 102 may further be configured to control rendering of the aligned 3D anatomical surface on an output device, such as a display screen to enable continuous navigation towards the region-of-interest in the anatomical portion during the surgery. In accordance with an embodiment, the image-processing device 102 may be configured to transmit the aligned reconstructed 3D anatomical surface to the display device 108, via the communication network 110. The display device 108 may be configured to render the received, aligned 3D anatomical surface of the anatomical portion on the display screen. In accordance with an embodiment, the display screen may be integrated with the image-processing device 102 when the image-processing device 102 is a head-mounted device or a wearable device for ease of navigation during the surgery to provide real-time or near real-time assistance in the surgery of the anatomical portion.

Figure 2:
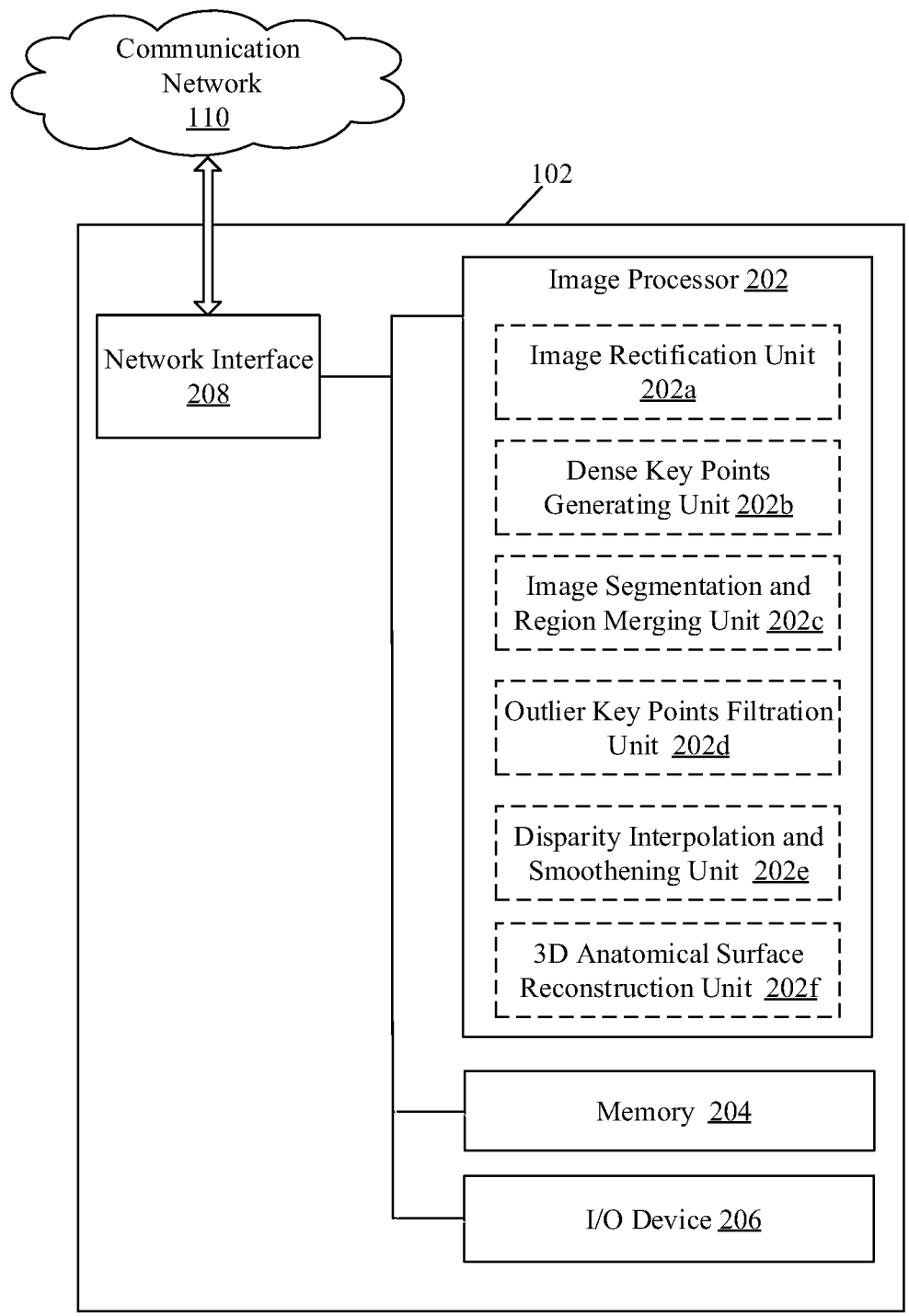
FIG. 2 is a block diagram that illustrates an exemplary image-processing device to reconstruct a 3D anatomical surface, in accordance with an embodiment of the disclosure.

FIG. 2 is a block diagram that illustrates an exemplary image-processing device that reconstruct 3D anatomical surface, in accordance with an embodiment of the disclosure. FIG. 2 is explained in conjunction with elements from FIG. 1. With reference to FIG. 2, the image-processing device 102 may include an image processor 202, a memory 204, one or more input/output (I/O) devices, such as an I/O device 206, and a network interface 208. The block diagram may further include one or more specialized processing units, such as an image rectification unit 202a; a dense key points generating unit 202b; an image segmentation and region merging unit 202c; an outlier key points filtration unit 202d; a disparity interpolation and smoothing unit 202e; and a 3D anatomical surface reconstruction unit 202f.

The image processor 202 may be communicatively coupled to the memory 204, the I/O device 206, and the network interface 208. The network interface 208 may communicate with the imaging device 104, and the display device 108, via the communication network 110, under the control of the image processor 202.

The image processor 202 may comprise suitable logic, circuitry, interfaces, and/or code that may be configured to execute a set of instructions stored in the memory 204. The image processor 202 may be configured to provide instructions to one or more specialized units to perform one or more specific operations. The image processor 202 may be configured to compute disparity of the one or more matched key points in the determined second set of key points. The image processor 202 may be further configured to align the reconstructed 3D anatomical surface with the 3D data associated with the pre-operative state of the anatomical portion during the surgery. The image processor 202 may be implemented based on a number of processor technologies known in the art. Examples of the image processor 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The image rectification unit 202a may comprise suitable logic, circuitry, interfaces, and/or code that may be configured to rectify the received plurality of stereo images of the anatomical portion in the event that one or more parameter values of the imaging device 104 are less than the one or more corresponding specified threshold values. The one or more parameter values of the imaging device 104 may correspond to intrinsic and/or extrinsic camera parameters. The image rectification unit 202a may rectify the received plurality of stereo images based on one or more algorithms known in the art, such as planar rectification, cylindrical rectification and/or polar rectification algorithms.

The dense key points generating unit 202b may comprise suitable logic, circuitry, interfaces, and/or code that may be configured to identify the first set of key points with the point density greater than the threshold value. The dense key points generating unit 202b may identify the first set of key points. The first set of key points may represent dense candidate key points automatically generated by the dense key points generating unit 202b. In accordance with an embodiment, various key point matching algorithms known in the art, such as a PCA patch matching, a Wavelet transformed matching, or a scale-invariant feature transform (SIFT) algorithm, may be utilized for such identification and/or the generation of the first set of key points.

The image segmentation and region merging unit 202c may comprise suitable logic, circuitry, interfaces, and/or code that may be configured to generate the plurality of regions based on segmentation of the received plurality of stereo images of the anatomical portion. The image segmentation and region merging unit 202c may be further configured to combine at least two of the generated plurality of regions. The at least two of the generated plurality of regions may be combined based on a density of the identified first set of key points in the at least two of the generated plurality of regions. The image segmentation and region merging unit 202c may further utilize one or more techniques, such as iterative segmentation and merging regions to derive the quick and accurate segmentation of the received plurality of stereo images.

The outlier key points filtration unit 202d may comprise suitable logic, circuitry, interfaces, and/or code that may be configured to filter one or more outlier key points from the identified first set of key points to determine a second set of key points. The outlier key point may be filtered out based on one or more algorithms known in the art, such as Random sample consensus (RANSAC). The high precision RANSAC with multi-view geometry algorithm may be used as an iterative method to filter outlier key points.

The disparity interpolation and smoothing unit 202e may comprise suitable logic, circuitry, interfaces, and/or code that may be configured to compute disparity of the one or more matched key points in the determined second set of key points. The disparity interpolation and smoothing unit 202e may be configured to interpolate the disparity in the generated second set of key points based on one or more interpolation parameters. The disparity interpolation and smoothing unit 202e may utilize one or more techniques, such as radial basis function (RBF) disparity interpolation, to interpolate each key point in the generated second set of key points. The disparity interpolation and smoothing unit 202e may be further configured to perform the smoothing operation on the interpolated disparity in the generated second set of key points. The disparity interpolation and smoothing unit 202e may utilize membrane energy based disparity smoothing to smoothen the interpolated disparity in the generated second set of key points. The interpolated disparity may be smoothened based on the membrane energy value of each of the interpolated key points in the generated second set of key points.

The 3D anatomical surface reconstruction unit 202f may comprise suitable logic, circuitry, interfaces, and/or code that may be configured to reconstruct the 3D anatomical surface of the anatomical portion based on the smoothing operation performed on the disparity corresponding to the generated second set of key points. The smoothing operation may smoothly reduce disparity of one or more matched key points in the determined second set of key points. The 3D anatomical surface reconstruction unit 202f may further utilize one or more techniques, such as 3D surface rendering and/or 3D sampling, to generate the 3D anatomical surface of the anatomical portion.

The one or more specialized processing units, as discussed above, may be implemented as a separate processor or circuitry in the image-processing device 102. In an embodiment, the one or more specialized processing units and the image processor 202 may be implemented as an integrated processor or a cluster of processors that perform the functions of the one or more specialized processing units and the image processor 202, collectively. In an embodiment, the one or more specialized processing units may be implemented utilizing a set of instructions stored in the memory 204, which upon execution by the image processor 202, may perform the functions of the image-processing device 102.

The memory 204 may comprise suitable logic, circuitry, and/or interfaces that may be configured to store a machine code and/or a set of instructions executable by the image processor 202, the image rectification unit 202a; the dense key points generating unit 202b; the image segmentation and region merging unit 202c; the outlier key points filtration unit 202d; the disparity interpolation and smoothing unit 202e; and the 3D anatomical surface reconstruction unit 202f. The memory 204 may be configured to store the plurality of stereo images of the anatomical portion, one or more parameter values of the imaging device 104, the identified first set of key points, and the determined second set of key points. The key points may also be referred to as point set. The memory 204 may be further configured to store the plurality of regions based on segmentation of the received plurality of stereo images, the combined plurality of region, the one or more interpolation parameters, and membrane energy value of each of the interpolated disparity and one or more disparity parameters. The memory 204 may be further configured to store the reconstructed 3D anatomical surface of the anatomical portion. The memory 204 may be further configured to store aligned reconstructed 3D anatomical surface with 3D data associated with pre-operative state of the anatomical portion. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from the one or more users, such as a surgeon or other healthcare professional. The I/O device 206 may be further configured to provide an output to the one or more users. The I/O device 206 may comprise various input and output devices that may be operable to communicate with the image processor 202. Examples of the input devices may include, but are not limited to, a touch screen, physical input buttons, an eye-gaze detection sensor, a gesture detection sensor, a joystick, a microphone, and/or a docking station. Examples of the output devices may include, but are not limited to, an-inbuilt display screen, an augmented reality projection screen, a head-mounted display, a smart-glass display, a display screen integrated in a computer-assisted surgery system, a touch screen display, and/or a speaker.

The network interface 208 may comprise suitable logic, circuitry, interfaces, and/or code that may be configured to connect and communicate with an external display, such as the display device 108, via the communication network 110. The network interface 208 comprise one or more transmitters, and/or one or more receivers, which may be integrated or separate, and may be configured to implement known technologies to support wired or wireless communication with the communication network 110. The network interface 208 may include, but is not limited to, an antenna, a frequency modulation (FM) network interface, one or more radio frequency (RF) transmitters, and/or receivers, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the imaging device 104 may be configured to capture a pair of video of the anatomical portion of a patient in an operating room (OR). The pair of video may correspond to the plurality of stereo images that may be continuously or intermittently captured from the imaging device 104, such as a surgical-grade stereoscopic imager. The pair of video of the anatomical portion may be captured in an intra-operative state. The pair of video may be captured by the imaging device 104, based on an input provided by a user, such as a nurse, a physician, and other healthcare professional. The input may be provided by the user, by a gesture and/or selection of a graphical button rendered on a user interface rendered on a display screen, such as the display device 108. Alternatively, the input may be provided by a button-press event of a hardware button available at the image-processing device 102 or the imaging device 104. Further, the imaging device 104 may be configured to transmit the captured pair of video of the anatomical portion to the image processor 202.

In accordance with an embodiment, the image-processing device 102, in conjunction with the network interface 208, may receive the plurality of stereo images of the captured pair of video from the imaging device 104, via the communication network 110. In such a case, the imaging device 104 may comprise at least two image sensors configured to capture the pair of video. In accordance with an embodiment, the image rectification unit 202a may be configured to rectify the received plurality of stereo images of the anatomical portion. The rectification is performed in the event that the imaging device 104 is not calibrated for the intrinsic and/or extrinsic camera parameters. The image rectification includes transformation of the selected set of 2D image frames of received plurality of stereo images onto a common image plane (or common map coordinate system). The image rectification unit 202a may rectify the received plurality of stereo image based on one or more algorithms known in the art, such as planar rectification, cylindrical rectification and polar rectification algorithms.

In accordance with an embodiment, the dense key points generating unit 202b may be configured to identify a first set of key points with a point density greater than a threshold value. The first set of key points may be identified based on matching of each key point of a left image with corresponding key point of a right image of the received plurality of stereo images of the anatomical portion. The dense key points generating unit 202b may identify the first set of key points, based on one or more known in the art key point matching algorithms known in the art.

In accordance with an embodiment, the image segmentation and region merging unit 202c may be configured to generate the plurality of regions based on segmentation of the received plurality of stereo images of the anatomical portion. The image segmentation and region merging unit 202c may be further configured to combine at least two of the generated plurality of regions. The at least two of the generated plurality of regions may be combined based on a density of the identified first set of key points in the at least two of the generated plurality of regions. The image segmentation and region merging unit 202c may further utilize one or more techniques, such as iterative segmentation and merging regions to derive optimal and quick segmentation of the received plurality of stereo images.

In accordance with an embodiment, the outlier key points filtration unit 202d may be configured to filter the one or more outlier key points from the identified first set of key points to determine a second set of key points. The outlier key points filtration unit 202d may be configured to determine one or more incorrect, outlier, and/or noisy key points/data from the identified first set of key points. The outlier key point may be filtered out based on one or more algorithms known in the art, such as RANdom Sample Consensus (RANSAC). The high precision RANSAC with multi-view geometry algorithm may be used as an iterative method to filter outlier key points. The RANSAC algorithm may be based on certain predetermined models that are structure-based, such as a physical structure of the anatomical portion. In accordance with an embodiment, the RANSAC algorithm may be utilized to remove outlying matches that do not fit with 3D rigid transformations (such as rotation, translation, or other transformation assumptions). The outlier key points filtration unit 202d may be configured to communicate the determined second set of key points to the image processor 202.

In accordance with an embodiment, the image processor 202 may be configured to compute disparity of the one or more matched key points in the received second set of key points. Disparity of the one or more matched key points may correspond to an extent of difference or distance in coordinates for similar features within two stereo images, such as the left image and the right image. The disparity estimation may facilitate the determination of disparity maps for the plurality of stereo images of the anatomical portion. The image processor 202 may communicate the matched key points and disparity maps of the plurality of stereo images of the anatomical portion to the disparity interpolation and smoothing unit 202e.

In accordance with an embodiment, the disparity interpolation and smoothing unit 202e may be configured to interpolate the computed disparity of the one or more matched key points in the determined second set of key points based on the disparity maps received from the image processor 202. The disparity interpolation and smoothing unit 202e may be configured to interpolate the disparity computed from the generated second set of key points based on one or more interpolation parameters. The disparity interpolation and smoothing unit 202e may utilize one or more techniques, such as radial basis function (RBF) disparity interpolation, to interpolate the disparity computed from the generated second set of key points. The disparity interpolation and smoothing unit 202e may be further configured to perform the smoothing operation on the interpolated disparity computed from the generated second set of key points. The disparity interpolation and smoothing unit 202e may utilize one or more techniques, such as membrane energy based disparity smoothing, to smoothen the disparity computed from the generated second set of key points. The interpolated key points may be smoothened based on the membrane energy value of each of the disparity computed from the generated second set of key points.

In accordance with an embodiment, the 3D anatomical surface reconstruction unit 202f may be configured to reconstruct the 3D anatomical surface of the anatomical portion based on the smoothing operation performed on the disparity computed from the generated second set of key points. In accordance with an embodiment, the smoothening may smoothly reduce the disparity of one or more matched key points in the determined second set of key points. The 3D anatomical surface reconstruction unit 202f may further utilize one or more techniques, such as 3D surface rendering and/or 3D sampling, to generate the 3D anatomical surface of the anatomical portion. The 3D anatomical surface reconstruction unit 202f may be configured to communicate the reconstructed 3D anatomical surface to the image processor 202.

In accordance with an embodiment, during the surgery, the image processor 202 may be further configured to align the reconstructed 3D anatomical surface with the 3D data, such as the MRI data, associated with the pre-operative state of the anatomical portion. The 3D data may be aligned with the reconstructed 3D anatomical surface in real-time or near real-time to enable continuous navigation towards a region-of-interest in the anatomical portion during the surgery. The image processor 202 may be configured to control rendering of the aligned reconstructed 3D anatomical surface on the display device 108 to enable continuous navigation towards the region-of-interest in the anatomical portion during the surgery. As a result of tissue deformation and/or displacement of anatomical structures after exposure of the tissue of the anatomical portion during the surgery, it may be difficult to evaluate the displacement of the anatomical structures during the surgery. Thus, the real-time or near real-time rendering of the accurately aligned reconstructed 3D anatomical surface on the display device 108 may provide reliable assistance to the surgeon to navigate through the visible surfaces of the anatomical portion during the surgery in the reference frame of pre-operative MRI taken before the surgery.

Figure 3A:
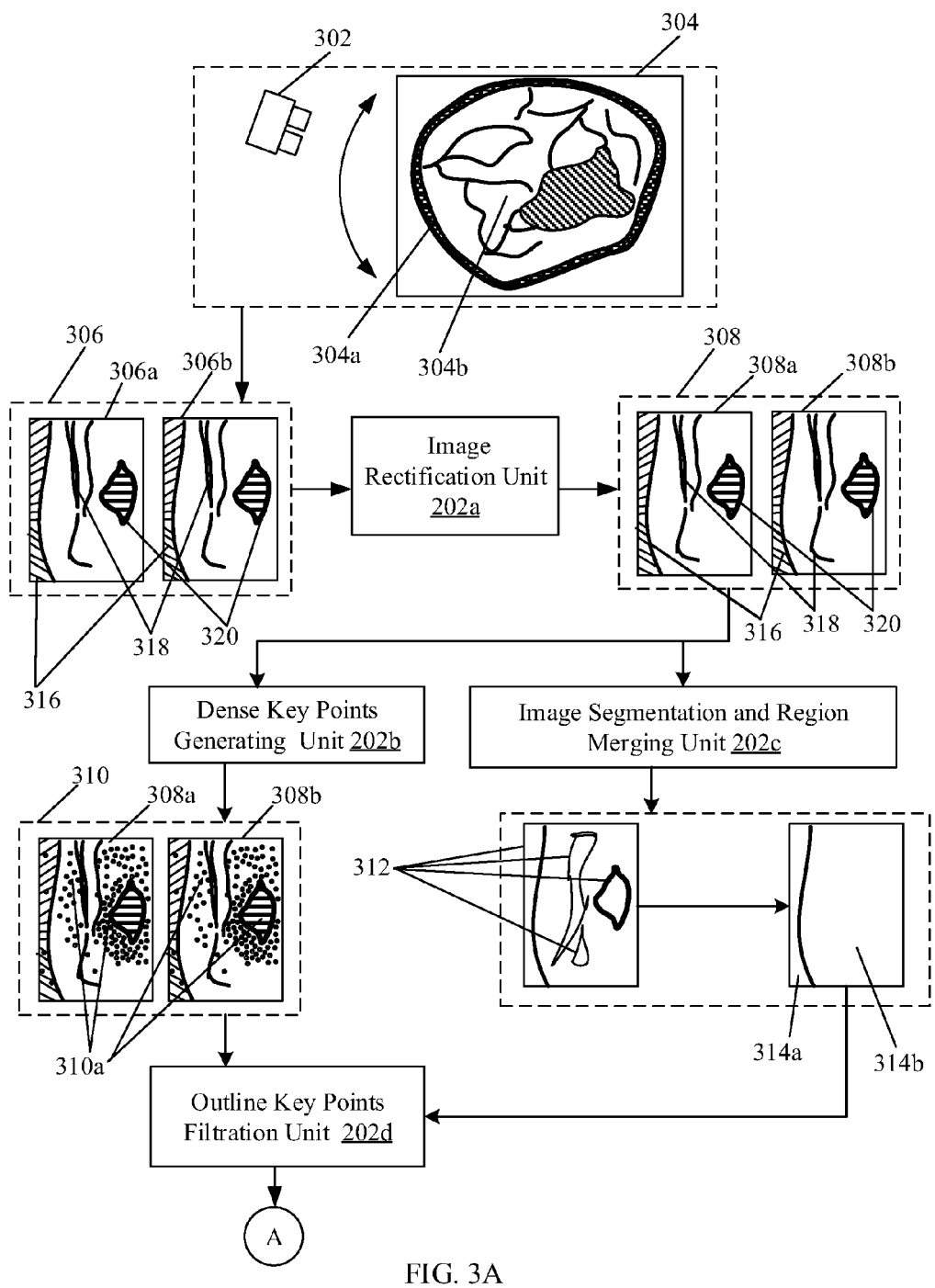
FIGS. 3A, 3B, and 3C are detailed block diagrams that collectively illustrate an exemplary scenario for implementation of the disclosed image processing system and method to reconstruct a 3D anatomical surface, in accordance with an embodiment of the disclosure.
Figure 3B:
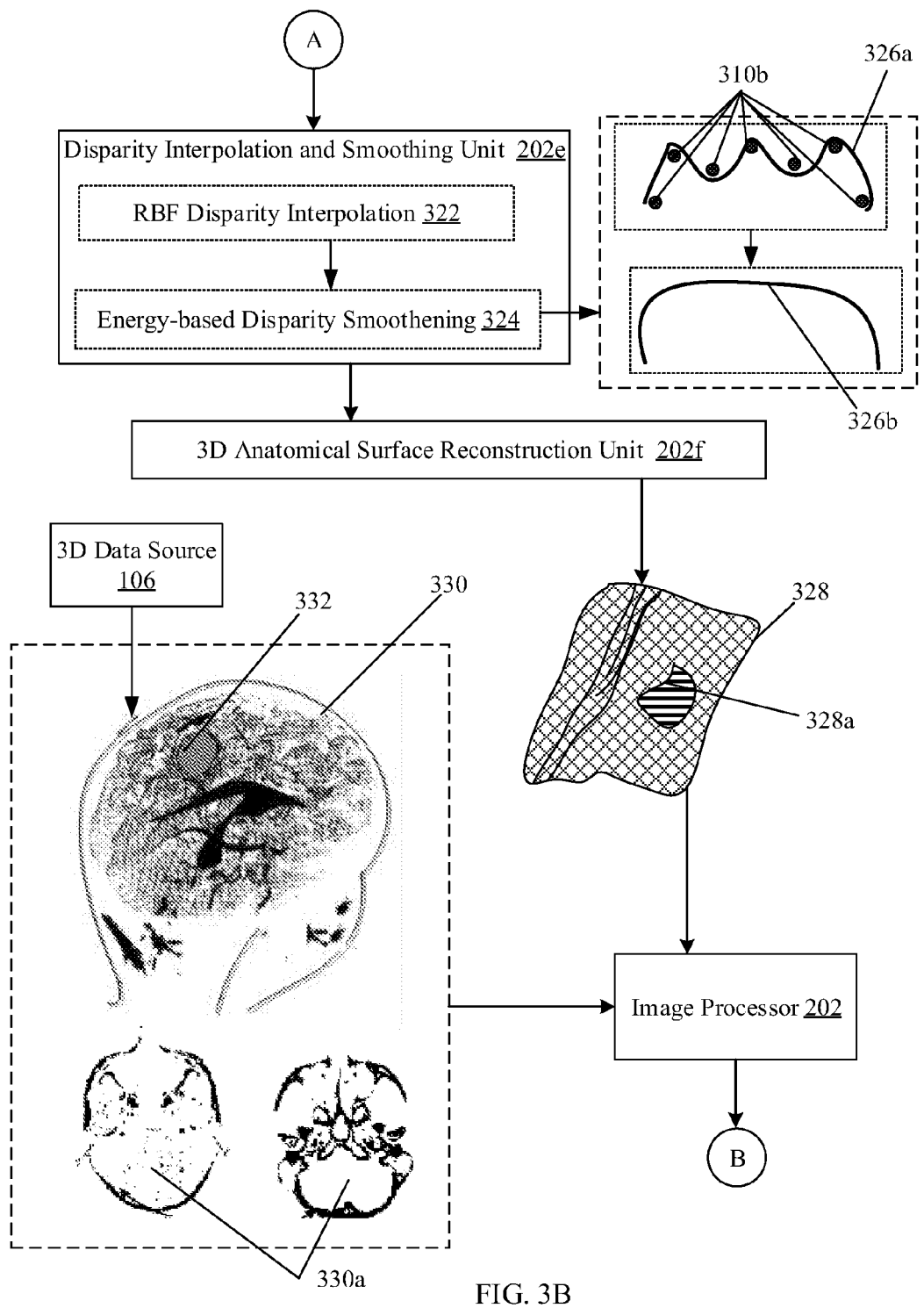
Figure 3C:
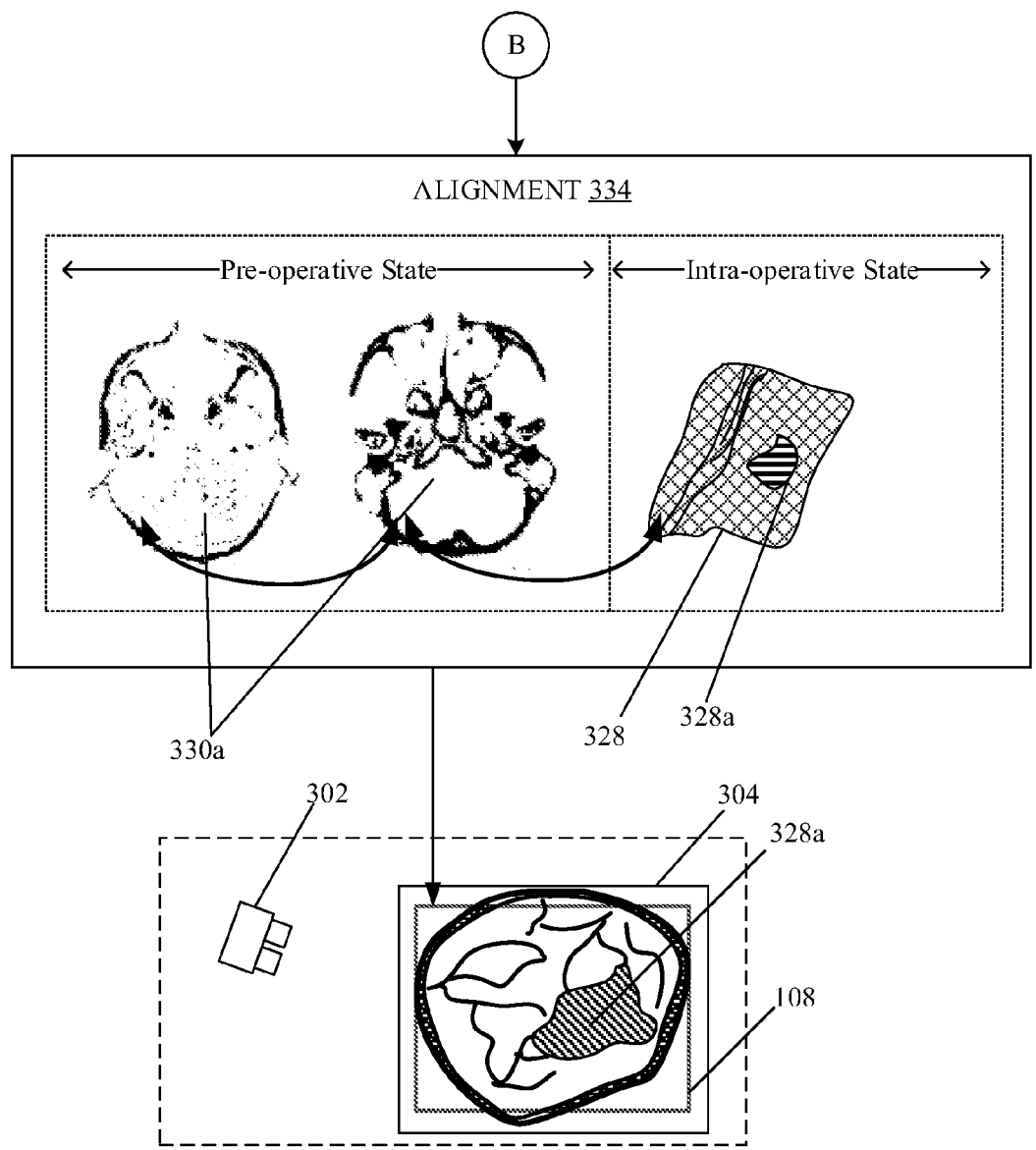

FIGS. 3A, 3B, and 3C, are detailed block diagrams that illustrate an exemplary scenario for implementation of the disclosed image-processing system and method to reconstruct 3D anatomical surface, in accordance with an embodiment of the disclosure. FIGS. 3A, 3B, and 3C are explained in conjunction with elements from FIG. 1 and FIG. 2.

With reference to FIG. 3A, there is shown a stereoscopic camera 302 and a brain region 304 of a patient under surgery. A skull portion 304a and a brain tissue surface 304b underlying the skull portion 304a is shown in the brain region 304. There is further shown a first pair of stereo image frames 306, a first pair of rectified stereo image frames 308, a view 310 of the first pair of rectified stereo image frames 308 with a first set of key points 310a. There is further shown a plurality of regions 312, a discarded region 314a from the plurality of regions 312, and a combined region 314b. The first pair of stereo image frames 306 may include a left image frame 306a and a right image frame 306b. Similarly, the first pair of rectified stereo image frames 308 may include a left image 308a and a right image 308b. There is also shown a first portion 316, a second portion 318, and a third portion 320 in the first pair of stereo image frames 306, and the first pair of rectified stereo image frames 308. The first portion 316 may correspond to the skull portion 304a or a portion of a surgical instrument, such as a retractor, which may be used to hold and separate edges of a surgical incision during the surgery. The second portion 318 may correspond to arteries, veins, and other nearby visible brain tissue surface area of the brain tissue surface 304b. The third portion 320 may correspond to an affected surface area of the brain tissue surface 304b due to a neurological disease. For instance, the third portion 320 may be a potential visible surface area, such as a tissue surface of a tumor cavity, which may lead to a region-of-interest in the brain region 304.

In accordance to the exemplary scenario, the stereoscopic camera 302 may correspond to the imaging device 104 (FIG. 1). The block diagram further illustrates the various devices and one or more specialized units, as explained in FIGS. 1 and 2. The image-processing device 102 may be communicatively coupled to the stereoscopic camera 302, the 3D data source 106, and the display device 108, via the communication network 110 (FIG. 1).

In operation, in the intra-operative state, the surgeon may open the skull portion 304a and look into the brain tissue surface 304b of the brain region 304 using the stereoscopic camera 302 that may be mounted on (or integrated with) a surgical microscope. The stereoscopic camera 302 may be configured to capture a pair of video of the brain region 304. In accordance with an embodiment, the image rectification unit 202a may be configured to receive the pair of video of the brain region 304 from the stereoscopic camera 302. The image rectification unit 202a may be configured to rectify each pair of stereo images of the received pair of video to generate a plurality of rectified stereo image pairs. For instance, as shown, the left image frame 306a and the right image frame 306b of the first pair of stereo image frames 306 may be rectified by the image rectification unit 202a to generate the first pair of rectified stereo image frames 308.

In certain scenarios, the stereoscopic camera 302 may not be calibrated either for intrinsic and/or extrinsic camera parameters. Geometric camera calibration is a technique that estimates various parameters of a lens and image sensors of an image-capturing device, such as the stereoscopic camera 302. Usually, such parameters may refer to the intrinsic and extrinsic camera parameters. Examples of the intrinsic camera parameters may include focal length and/or image size parameters of the stereoscopic camera 302. Examples of the extrinsic camera parameters may include a "3×3 Rotation matrix" and a "3×1 Translation vector", known in the art, which may be pre-estimated for the stereoscopic camera 302. Thus, in a case, where the stereoscopic camera 302 may not be calibrated either for the intrinsic and/or extrinsic camera parameters, the captured pair of video and thus, the different pairs of stereo image frames may not be calibrated. In such scenarios, the rectification of the received different pairs of stereo image frames may be performed to align horizontal image scan lines. For instance, size of the received first pair of stereo image frames 306 may be "960×960". The image rectification unit 202a may minimize rectification error in the received first pair of stereo image frames 306 in range of 0.4~0.7 pixel. The rectification of received first pair of stereo image frames 306 may include transformation of the received first pair of stereo image frames 306 onto a common image plane or common map coordinate system.

In certain other scenarios, the stereoscopic camera 302 may be pre-calibrated for intrinsic and/or extrinsic camera parameters. In such scenarios, the captured pair of video and thus, the different pairs of stereo image frames may not require rectification as geometric distortion may not exist, or may be within specified acceptable limit. In such a case, the rectification process may not be required and the different pairs of stereo image frames may be directly provided to the dense key points generating unit 202b for further processing.

The image rectification unit 202a may be configured to communicate the first pair of rectified stereo image frames 308 to the dense key points generating unit 202b. In accordance with an embodiment, the first pair of rectified stereo image frames 308 may also be communicated to the image segmentation and region merging unit 202c in parallel. In accordance with an embodiment, the dense key points generating unit 202b may be configured to identify the first set of key points 310a with a point density greater than a threshold value. The first set of key points 310a may be identified based on matching of each key point of the left image 308a with corresponding key point of the right image 308b of the received first pair of rectified stereo image frames 308 of the brain region 304. The dense key points generating unit 202b may identify the first set of key points 310a, based on one or more key point matching algorithms known in the art, such as SIFT. The dense key points generating unit 202b may also communicate the left image 308a and the right image 308b 10b with the identified first set of key points 310a, as shown in the view 310 to the image segmentation and region merging unit 202c.

In accordance with an embodiment, the image segmentation and region merging unit 202c may be configured to generate the plurality of regions 312 based on the graph based segmentation of the first pair of rectified stereo image frames 308. The first pair of rectified stereo image frames 308 may include certain regions that are on different height or plane at the time of capture of the first pair of stereo image frames 306 during the surgery. For example, when the skull is opened during the surgery, brain tissue may shrink as the fluid between the skull and the brain flows out. Further, the brain tissue surface 304b and the skull portion 304a of the skull of the patient may lie at different height. Thus, the discarded region 314a that may correspond to the skull portion 304a in the first pair of rectified stereo image frames 308 may not be necessary for the 3D anatomical surface reconstruction purpose. Further, certain surgical instruments, such as the retractor, may be used to hold and separate edges of a surgical incision during the surgery. The discarded region 314a in the first pair of rectified stereo image frames 308 may also include some portions of such instruments, such as the first portion 316, captured by the stereoscopic camera 302 during surgery. This type of regions, such as the discarded region 314a, may further may not be necessary for the 3D anatomical surface reconstruction purpose.

Additionally, dense key points may not be generated for such regions, such as the first portion 316, as the focus of the imaging device 104 may be on certain anatomical surface area, such as the third portion 320, that is of importance to access a region-of-interest to be operated in the brain region 304. Based on a density of the identified first set of key points 310a in each region (such as the first portion 316, the second portion 318, and the third portion 320), it may be determined if that region should be included into a main region, such as the combined region 314b, during segmentation. Thereafter, two or more of the generated plurality of regions 312 may be combined based on the density of the identified first set of key points 310a in the two or more of the generated plurality of regions 312. The two or more of the generated plurality of regions may be merged into a single main region, such as the combined region 314b. A single region may enable quicker reconstruction of the 3D anatomical surface. The two or more of the generated plurality of regions 312 may correspond to the second portion 318 and the third portion 320 in the first pair of stereo image frames 306 and the first pair of rectified stereo image frames 308. The image segmentation and region merging unit 202c may further utilize one or more techniques, such as iterative segmentation and merging regions to derive best segmentation of the first pair of rectified stereo image frames 308 with the identified first set of key points 310a shown in the view 310.

The outlier key points filtration unit 202d, in conjunction with the image processor 202 may be configured to determine one or more incorrect, outlier, and/or noisy key points/data. In accordance with an embodiment, the outlier key points filtration unit 202d may be configured to filter the one or more outlier key points from the identified first set of key points 310a to determine a second set of key points. For example, initial count of the identified first set of key points 310a may be 1500. After flirtation, the number of the key points may be 1100 i.e. the second set of key points. The second set of key points may be determined based on a fundamental matrix. The outlier key points may be filtered out by RANSAC. The high precision RANSAC with multi-view geometry algorithm may be applied as an iterative method to filter outlier key points based on the fundamental matrix. The second set of key points may be determined in a quick run time, per pair of image frame of the captured pair of video. The outlier key points filtration unit 202d may be configured to communicate the determined second set of key points to the image processor 202.

In accordance with an embodiment, the image processor 202 may be configured to compute disparity of the one or more matched key points in the received second set of key points. Disparity of the one or more matched key points may correspond to a difference or a distance between two corresponding key points of the second set of key points in the left image 308a and right image 308b of the first pair of rectified stereo image frames 308.

With reference to FIG. 3B, there is shown a portion 310b of the determined second set of key points, a first membrane portion 326a, a second membrane portion 326b. The first membrane portion 326a may be derived from the portion 310b of the determined second set of key points and represents a noisy and irregularly-shaped membrane. The second membrane portion 326b may represent a smoothened membrane based on energy-based disparity smoothening 324. There is further shown the disparity interpolation and smoothing unit 202e that may utilize one or more techniques, such as multiquadric radial basis function (RBF) disparity interpolation 322, to interpolate each key point in the generated second set of key points. The disparity interpolation and smoothing unit 202e may be configured to perform membrane energy based disparity smoothing operation 324, to smoothen the interpolated disparity computer from the generated second set of key points.

There is further shown a 3D anatomical surface 328, the 3D data source 106 (FIG. 1), pre-operative 3D data 330 with a region-of-interest 332, and the image processor 202 (FIG. 2). The MRI data 330a may be a part of the pre-operative 3D data 330. The 3D anatomical surface 328 may be a 3D surface structure, such as a mesh structure, of the brain tissue surface 304b generated by the 3D anatomical surface reconstruction unit 202f. During the surgery, a surgeon may require to navigate through a visible surface, such as the brain tissue surface 304b, of the brain region 304 of the patient to reach the region-of-interest 332 in the brain region 304. For instance, the region-of-interest 332 may be a brain tumor that may need to be operated by the surgeon. There is further shown a region 328a in the 3D anatomical surface 328 that may be a visible surface area under focus in an event the surgeon visualizes the brain region 304 by use of the stereoscopic camera 302 during the surgery. The region 328a may correspond to the third portion 320 in the received first pair of stereo image frames 306 (FIG. 3A).

In accordance with an embodiment, the disparity interpolation and smoothing unit 202e may be configured to interpolate the computed disparity of the one or more matched key points in the determined second set of key points based on the disparity maps received from the image processor 202. The disparity interpolation and smoothing unit 202e may be configured to interpolate each key point in the generated second set of key points based on one or more interpolation parameters. The disparity interpolation and smoothing unit 202e may utilize one or more techniques, such as multi-quadric radial basis function (RBF) disparity interpolation 322, to interpolate each key point in the generated second set of key points, according to the following equation (1):

$$d(x)=\Sigma_{i=1}^{n} w_i \phi(\|x-x_i\|); \text{ and } \phi(r)=\overline{1+(\overrightarrow{\in r})^2} \quad (1)$$

Where, d(x) is distance function that calculate a disparity value at pixel x;

$x_i$ is the image coordinates (x,y) in the right image 308b;

$\|x-x_i\|$ is the Euclidian distance between the x and $x_i$;

$w_i$=RBF weights; and $\phi(r)$ is the radial basis function.

The interpolation of the computed disparity of the one or more matched key points in the determined second set of key points may be performed in a faster computation time as a result of the filtration of the one or more outlier key points. The disparity interpolation and smoothing unit 202e may be further configured to perform the smoothing operation on the disparity computed from the generated second set of key points. The disparity interpolation and smoothing unit 202e may utilize membrane energy-based disparity smoothing 324, to smoothen the interpolated disparity computed from the generated second set of key points. The interpolated disparity may be smoothened based on the membrane energy value of each of the interpolated disparity computed from the generated second set of key points. The disparity interpolation and smoothing unit 202e may be further configured to determine low-pass bandwidth proportional to membrane energy value of each of the interpolated disparity computed from the generated second set of key points. The disparity interpolation and smoothing unit 202e may be configured to calculate membrane energy value of each of the interpolated disparity computed from the generated second set of key points, according to the following equation (2):

$$\sigma \sim E(p)=\Sigma_{p \in w} d_x^2 + d_y^2 \quad (2)$$

Where, $d_x^2$ is disparity slope in x direction;

E(p) is membrane energy at key point p within window w; and

Average σ (smoothing kernel) for about 20 pixels.

For example, the first membrane portion 326a that represents a noisy membrane may be smoothened into the second membrane portion 326b based on the energy-based disparity smoothening 324, by use of the equation 2. In accordance with an embodiment, the 3D anatomical surface reconstruction unit 202f may be configured to reconstruct the 3D anatomical surface 328. The 3D anatomical surface 328 reconstruction may be based on at least the smoothing operation, such as the membrane energy-based disparity smoothing, performed on the disparity computed from the generated second set of key points to smoothen out the disparity of one or more matched key points in the determined second set of key points. The second membrane portion 326b may be considered a building-block of the 3D anatomical surface 328. The 3D anatomical surface reconstruction unit 202f may utilize 3D surface rendering and/or 3D sampling, to generate the 3D anatomical surface 328 of a visible surface, such as the brain tissue surface 304b, of the brain region 304. The 3D anatomical surface reconstruction unit 202f may be configured to communicate the reconstructed 3D anatomical surface 328 to the image processor 202.

In accordance with an embodiment, the image processor 202 may be further configured to align the reconstructed 3D anatomical surface 328 with the pre-operative 3D data 330 acquired either from the memory 204 or the 3D data source 106. Prior to the surgery, the MRI, CT, and/or PET scan of the brain region 304 is performed, i.e. at a time when the skull of patient is not opened up. Based on results of the scanning techniques, the pre-operative 3D data 330 may be generated from the MRI data 330a, and may be retrieved for further processing. The pre-operative 3D data 330 may be further used to reach the region-of-interest 332 using a surgical plan prepared prior to the surgery.

With reference to FIG. 3C, there is shown an alignment 334 of the MRI data 330a (a reference frame of pre-operative MRI taken before the surgery) with the 3D anatomical surface 328 generated in the intra-operative state. In accordance with an embodiment, the entire pre-operative 3D data 330 of the brain region 304 generated prior to the surgery may be aligned with the reconstructed 3D anatomical surface 328 in real-time or near real-time to enable continuous and easy navigation towards the region-of-interest 332 in the brain region 304 during the surgery. The image processor 202 may control rendering of the aligned view of the reconstructed 3D anatomical surface 328 along with the 3D data 330 on the display device 108. This may provide great assistance to the surgeon to navigate through the visible anatomical surfaces of the brain region 304 using the continuously generated reconstructed 3D anatomical surface 328 of the visible anatomical surfaces that may guide the surgeon to safely reach to the region-of-interest 332 in the brain region 304 during the surgery. In accordance with an embodiment, the image processor 202 may be configured to display one or more augmented reality (AR) tags to one or more portions of the reconstructed 3D anatomical surface 328 that may be superimposed on the brain tissue surface 304b of the brain region 304 under surgery to enable safe movement of surgical tools within the brain region 304 for assistance purpose. For example, an AR tag may be "You are in right path to access the region-of interest 332" or "this is a "X" surface, be careful". Thus, a reliable, a safe, and a real-time or near real-time 3D reconstruction of the visible anatomical surface(s), such as the 3D anatomical surface 328, is provided from 2D stereo input images of the brain tissue surface 304b to enable the surgeon to safely reach to the region-of-interest 332 in the brain region 304.

Figure 4A:
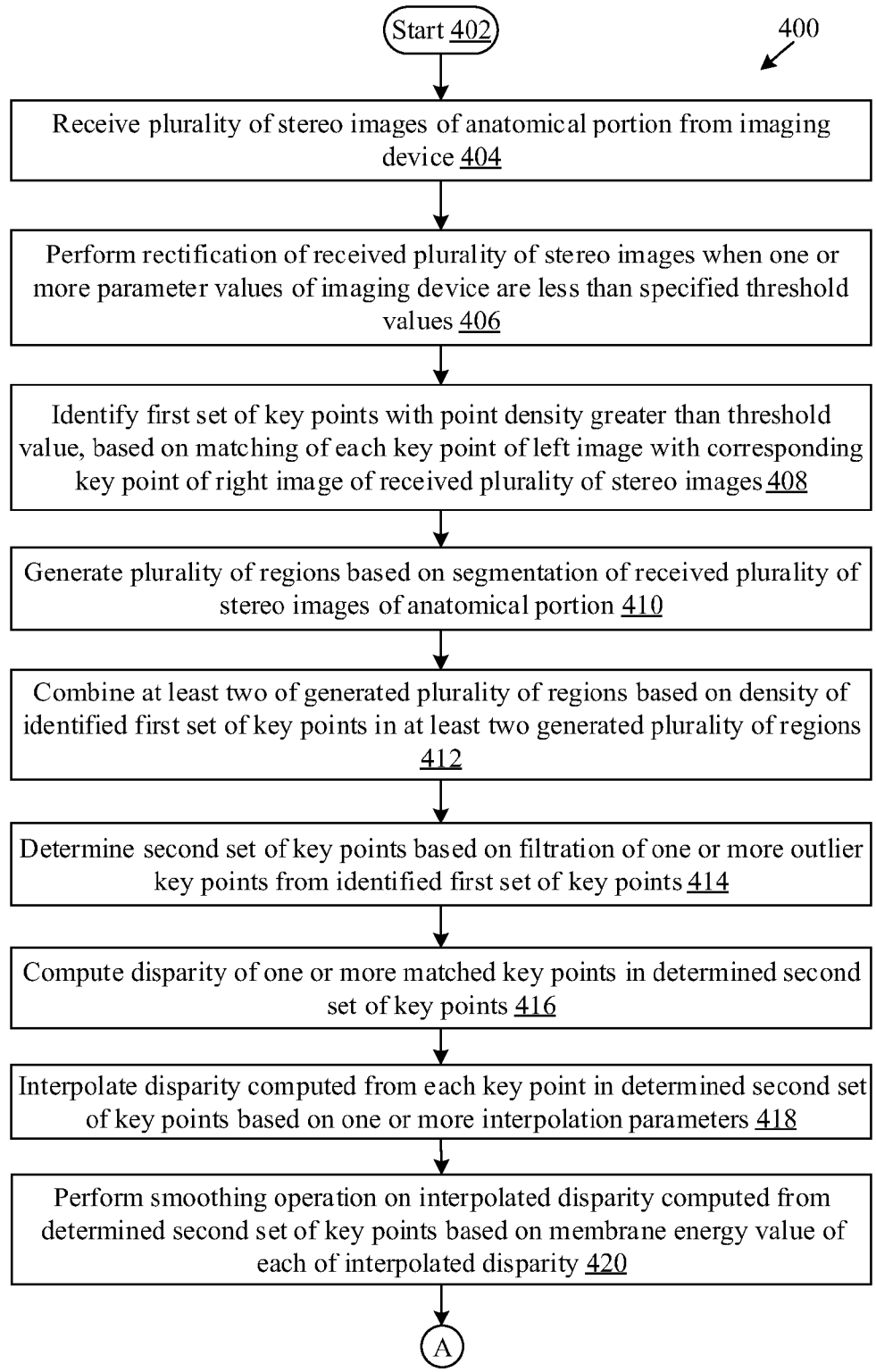
FIGS. 4A and 4B, collectively, depict a flowchart that illustrates an exemplary image processing method to reconstruct a 3D anatomical surface, in accordance with an embodiment of the disclosure.
Figure 4B:
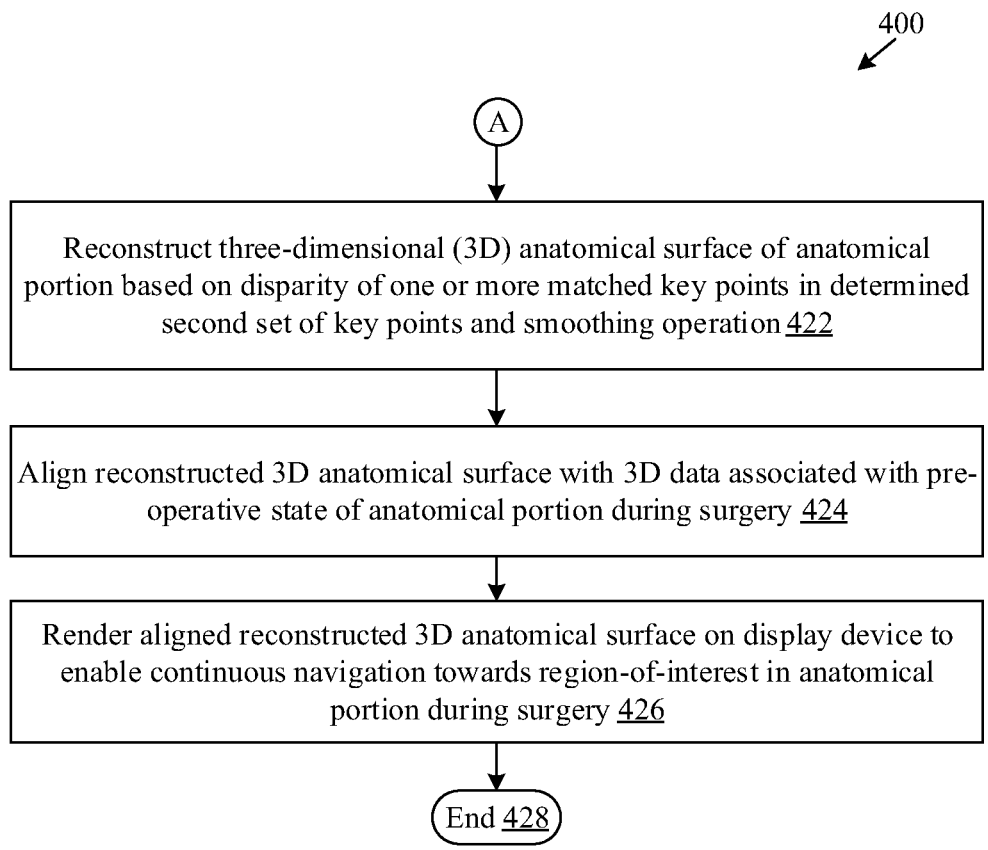

FIGS. 4A and 4B, collectively, depict a flowchart 400 that illustrates an exemplary image processing to reconstruct 3D anatomical surface, in accordance with an embodiment of the disclosure. The flowchart 400 is described in conjunction with FIG. 1, FIG. 2, and FIG. 3. The method, implemented in the image-processing device 102, starts at 402 and proceeds to 404.

At 404, a plurality of stereo images of an anatomical portion, such as the brain region 304, may be received by the image-processing device 102 from the imaging device 104. At 406, rectification of the received plurality of stereo images of the anatomical portion may be performed in an event that one or more parameter values of the imaging device 104 are less than one or more corresponding specified threshold values.

At 408, a first set of key points with a point density greater than a threshold value may be identified. The first set of key points may be identified based on matching of each key point of a left image with corresponding key point of a right image of the received plurality of stereo images of the anatomical portion. An example of the first set of key points, such as the first set of key points 310a, is shown and described in FIG. 3A.

At 410, a plurality of regions may be generated based on segmentation of the received plurality of stereo images of the anatomical portion. An example of the plurality of regions, such as the plurality of regions 312, is shown and described in FIG. 3A. At 412, at least two of the generated plurality of regions may be combined based on density of the identified first set of key points in the at least two generated plurality of regions. An example of the output of the combine operation, such as the combined region 314b, is shown and described in FIG. 3A.

At 414, a second set of key points may be determined based on filtration of one or more outlier key points from the identified first set of key points. At 416, a disparity of the one or more matched key points in the determined second set of key points may be computed. The disparity may be computed by use of the equation 1.

At 418, disparity computed from each key point in the generated second set of key points may be interpolated based on one or more interpolation parameters. For example, the disparity interpolation and smoothing unit 202e may utilize one or more techniques, such as multi-quadric radial basis function (RBF) disparity interpolation 322, to interpolate each disparity computed from the generated second set of key points, by use of the equation 1. At 420, smoothing operation may be performed on the interpolated disparity computed from the generated second set of key points based on a membrane energy value of each of the interpolated disparity. For example, as shown in FIG. 3B, the first membrane portion 326a that represents a noisy membrane may be smoothened to the second membrane portion 326b based on the energy-based disparity smoothening 324, by use of the equation 2.

At 422, a 3D anatomical surface, such as the 3D anatomical surface 328, of the anatomical portion may be reconstructed. The 3D anatomical surface may be reconstructed further based on the disparity of one or more matched key points in the determined second set of key points.

At 424, the reconstructed 3D anatomical surface may be aligned with a 3D data, such as the 3D data 330, associated with pre-operative state of the anatomical portion during a surgery. At 426, the aligned reconstructed 3D anatomical surface may be rendered on the display device 108, to enable continuous navigation towards a region-of-interest in the anatomical portion during surgery. The control passes to end 428.

In accordance with an embodiment of the disclosure, a system for image processing may comprise one or more circuits configured to receive, by an image-processing device 102, a plurality of stereo images of an anatomical portion from an imaging device 104. A first set of key points with a point density greater than a threshold value may be identified, based on matching of each key point of a left image with corresponding key point of a right image of the received plurality of stereo images of the anatomical portion. The first set of key points may be identified by one of the specialized processing units, such as the dense key points generating unit 202b. A second set of key points may be determined based on filtration of one or more outlier key points from the identified the first set of key points, by the outlier key points filtration unit 202d. A 3D anatomical surface of the anatomical portion may be reconstructed, by the 3D anatomical surface reconstruction unit 202f. The 3D anatomical surface reconstruction of the anatomical portion may be based on at least a smoothing operation performed on the disparity of one or more matched key points in the determined second set of key points.

During the operative procedure, such as the image-guided surgery, the surgeon may require to navigate through a visible surface of the anatomical portion of the subject, such as the patient, to reach the region-of-interest in the anatomical portion. It may be very difficult to navigate through the visible surface of the anatomical portion during the surgery in the reference frame of pre-operative MRI taken before the surgery. Thus, the disclosed system and method reconstructs, in real time or near real-time, a 3D anatomical surface of the anatomical portion, automatically, and in a faster computation time, as compared to conventional approaches of 3D surface reconstruction from an input of stereo camera, such as the stereoscopic camera 302. It is to be understood that the anatomical surfaces (such as a brain surface), of which the plurality of stereo images are captured, are different from other non-anatomical surfaces. The anatomical surfaces are usually devoid of sharp edges and planar areas. Further, the anatomical surfaces may be smeared with fluids, which may reflect light when the plurality of stereo images are captured. Thus, it may be more difficult to reconstruct 3D surface from an input of stereo cameras for natural anatomical surfaces. Further, the 3D anatomical surface reconstruction of anatomical portion performed by use of conventional approaches may not be safe due to potential exposure of such anatomical portion to radiation from intraoperative imaging, such as a 3D laser scanner or MRI scanner or other invasive techniques, used to display the anatomical surface of the anatomical portion. In addition, the conventional approaches for the 3D anatomical surface reconstruction of anatomical portion may not be efficient and useful for anatomical portion, such as a brain which may undergo certain deformation of tissue after exposure of the tissue of the anatomical portion during the surgery.

Thus, the disclosed system and method provides improved technique for reconstruction of 3D anatomical surface of the anatomical portion of the subject in real time or near real time, and in a faster computation time that may be used during the surgery. An improvement in the technology of digital image processing, image-capturing, and 3D visualization applied in the field of medical devices and computer-assisted surgery is provided as a result of the quick generation of enhanced 3D anatomical surface of the anatomical portion of the subject during surgery. For instance, at least the smoothing operation is performed on the generated second set of key points by the disparity interpolation and smoothing unit 202e, after filtration of one or more outlier key points from the identified first set of key points. The outlier key points filtration unit 202d, may be configured to determine one or more incorrect, outlier, and/or noisy key points/data from the identified first set of key points for the filtration. For example, the key points on the first portion 316, represent the skull portion 304a, and may not be required. This region is an unnecessary burden on the computational resource, and hence is omitted during reconstruction of the 3D anatomical surface, such as the 3D anatomical surface 328, of the anatomical portion. Further, the two or more of the generated plurality of regions may be merged into a single main region, such as the combined region 314b. A single region enables quicker and accurate reconstruction of the 3D anatomical surface. The disclosed operations performed by the image-processing device 102, improves the functioning of the image-processing device 102 itself to quickly and reliably reconstruct the 3D anatomical surface of the anatomical portion, used in neurosurgery, or other surgeries requiring a reconstruction of the 3D anatomical surface of the anatomical portion. This reliably reconstructed 3D anatomical surface in turn allows more accurate alignment with pre-operative MRI data, such as the pre-operative 3D data 330, to enable continuous navigation towards a region-of-interest, such as the region-of-interest 332, in the anatomical portion during the surgery.

Various embodiments of the disclosure may provide a non-transitory, computer-readable medium and/or storage medium, and/or a non-transitory machine readable medium and/or storage medium stored thereon, a machine code and/or a computer program with at least one code section executable by a machine and/or a computer for image processing to reconstruct three-dimensional (3D) anatomical surfaces. The at least one code section may cause the machine and/or computer to perform the operations that comprise receiving, by an image-processing device, a plurality of stereo images of an anatomical portion from an imaging device. A first set of key points with a point density greater than a threshold value may be identified, based on matching of each key point of a left image with corresponding key point of a right image of the received plurality of stereo images of the anatomical portion. A second set of key points may be determined based on filtration of one or more outlier key points from the identified the first set of key points. A three dimensional (3D) anatomical surface of the anatomical portion may be reconstructed based on at least a smoothing operation performed on the disparity of one or more matched key points in the determined second set of key points.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for image processing, comprising:
   circuitry configured to:
   receive a plurality of stereo images of an anatomical portion from an imaging device;
   identify a first set of key points with a point density greater than a threshold value, based on a match of each key point of a left image with corresponding key point of a right image of said received plurality of stereo images of said anatomical portion;
   determine a second set of key points based on filtration of at least one outlier key point from said identified first set of key points;
   determine a disparity between a plurality of key points of said determined second set of key points;
   smoothen said disparity between said plurality of key points of said determined second set of key points; and
   reconstruct a three dimensional (3D) anatomical surface of said anatomical portion based on said smoothened disparity between said plurality of key points of said determined second set of key points.

2. The system according to claim 1, wherein said circuitry is further configured to rectify said received plurality of stereo images of said anatomical portion based on at least one parameter value of said imaging device, and
   wherein said at least one parameter value is less than a threshold value.

3. The system according to claim 1, wherein said circuitry is further configured to generate a plurality of regions based on segmentation of said received plurality of stereo images of said anatomical portion.

4. The system according to claim 3, wherein said circuitry is further configured to combine at least two regions of said generated plurality of regions based on a density of said identified first set of key points in said at least two regions of said generated plurality of regions.

5. The system according to claim 1, wherein said circuitry is further configured to reconstruct said 3D anatomical surface based on interpolation of said disparity between said plurality of key points of said generated second set of key points, and
   wherein said interpolation of said disparity is based on at least one interpolation parameter.

6. The system according to claim 5, wherein said circuitry is further configured to smoothen said interpolated disparity based on a membrane energy value of said disparity.

7. The system according to claim 6, wherein said circuitry is further configured to determine said membrane energy value of said interpolated disparity based on at least one disparity parameter.

8. The system according to claim 1, wherein said imaging device corresponds to a stereoscopic imager.

9. The system according to claim 1, wherein said circuitry is further configured to align said reconstructed 3D anatomical surface associated with an intra-operative state of said anatomical portion with 3D data associated with a pre-operative state of said anatomical portion during surgery.

10. The system according to claim 9, wherein said circuitry is further configured to render said aligned reconstructed 3D anatomical surface on a display to enable continuous navigation towards a region-of-interest in said anatomical portion during a surgery.

11. A method for image processing to reconstruct three-dimensional (3D) anatomical surfaces, said method comprising:
- receiving, by circuitry of an image-processing device, a plurality of stereo images of an anatomical portion from an imaging device;
- identifying, by said circuitry, a first set of key points with a point density greater than a threshold value, based on matching of each key point of a left image with corresponding key point of a right image of said received plurality of stereo images of said anatomical portion;
- determining, by said circuitry, a second set of key points based on filtration of at least one outlier key point from said identified said first set of key points;
- determining, by said circuitry, a disparity between a plurality of key points of said determined second set of key points;
- smoothing, by said circuitry, said disparity between said plurality of key points of said determined second set of key points; and
- reconstructing, by said circuitry, a 3D anatomical surface of said anatomical portion based on said smoothened disparity between said plurality of key points of said determined second set of key points.

12. The method according to claim 11, further comprising rectifying, by said circuitry, said received plurality of stereo images of said anatomical portion based on at least one parameter value of said imaging device, and
wherein said at least one parameter value is less than a threshold value.

13. The method according to claim 11, further comprising generating, by said circuitry, a plurality of regions based on segmentation of said received plurality of stereo images of said anatomical portion.

14. The method according to claim 13, further comprising combining, by said circuitry, at least two regions of said generated plurality of regions based on a density of said identified first set of key points in said at least two regions of said generated plurality of regions.

15. The method according to claim 11, wherein said reconstruction of said 3D anatomical surface is further based on interpolation of said disparity, and
wherein said interpolation is based on at least one interpolation parameter.

16. The method according to claim 15, wherein said smoothing on said interpolated disparity is based on a membrane energy value of said interpolated disparity.

17. The method according to claim 16, further comprising determining, by said circuitry, said membrane energy value of said interpolated disparity based on at least one disparity parameter.

18. The method according to claim 11, wherein said imaging device corresponds to a stereoscopic imager.

19. The method according to claim 11, further comprising aligning, by said circuitry, said reconstructed 3D anatomical surface associated with an intra-operative state of said anatomical portion with 3D data associated with a pre-operative state of said anatomical portion during surgery.

20. The method according to claim 19, further comprising rendering, by said circuitry, of said aligned reconstructed 3D anatomical surface on a display to enable continuous navigation towards a region-of-interest in said anatomical portion during a surgery.

21. A non-transitory computer-readable medium having stored thereon computer-executable instructions that, when executed by a processor, cause an image-processing device to execute operations, the operations comprising:
- receiving a plurality of stereo images of an anatomical portion from an imaging device;
- identifying a first set of key points with a point density greater than a threshold value, based on matching of each key point of a left image with corresponding key point of a right image of said received plurality of stereo images of said anatomical portion;
- determining a second set of key points based on filtration of at least one outlier key point from said identified said first set of key points;
- determining a disparity between a plurality of key points of said determined second set of key points;
- smoothing said disparity between said plurality of key points of said determined second set of key points; and
- reconstructing a three-dimensional (3D) anatomical surface of said anatomical portion based on said smoothened disparity between said plurality of key points of said determined second set of key points.

\* \* \* \* \*